United States Patent [19]

Mohammadi et al.

[11] Patent Number: 5,178,217
[45] Date of Patent: Jan. 12, 1993

[54] GAS FOAM FOR IMPROVED RECOVERY FROM GAS CONDENSATE RESERVOIRS

[75] Inventors: Shane S. Mohammadi, Tustin, Calif.; John D. Collins, Richmond, Tex.

[73] Assignee: Union Oil Company of California, Los Angeles, Calif.

[21] Appl. No.: 739,213

[22] Filed: Jul. 31, 1991

[51] Int. Cl.⁵ .............................. E21B 43/22
[52] U.S. Cl. .................. 166/252; 166/268; 166/275; 166/309
[58] Field of Search ............. 166/252, 268, 273, 274, 166/275, 294, 305.1, 306, 309

[56] References Cited

U.S. PATENT DOCUMENTS

| | | | |
|---|---|---|---|
| 2,720,265 | 10/1955 | Tracht | 166/273 X |
| 3,149,668 | 9/1964 | Arendt | 166/274 X |
| 4,393,936 | 7/1983 | Josendal | 166/268 X |
| 4,548,267 | 10/1985 | Sheffield et al. | 166/268 |
| 5,046,560 | 9/1991 | Teletzke et al. | 166/268 X |
| 5,052,487 | 10/1991 | Wall | 166/303 X |

*Primary Examiner*—George A. Suchfield
*Attorney, Agent, or Firm*—Charles L. Hartman; Gregory F. Wirzbicki

[57] ABSTRACT

Gas-condensate having an API gravity value greater than 55° is produced by injecting (1) a light noncondensable gas and (2) a foaming agent comprising a surfactant and water into a subterranean formation containing the gas condensate.

33 Claims, No Drawings

GAS FOAM FOR IMPROVED RECOVERY FROM GAS CONDENSATE RESERVOIRS

BACKGROUND OF THE INVENTION

1. Field of the Invention

This invention relates to methods of improving hydrocarbon recovery from gas condensate reservoirs, and particularly to methods of increasing recovery in those gas condensate reservoirs which are already under gas injection.

2. State of the Art

Hydrocarbon products in a subterranean formation may not flow through the subterranean formation to the location of a recovery well. Although the hydrocarbons may be poorly flowing for different reasons, frequently, gas injection aids the recovery of these poorly flowing hydrocarbons. A hydrocarbon may be too viscous to flow in the subterranean formation, for example, because it is a heavy crude that is not hot enough to flow easily through the subterranean formation. Injection of hot gas can then be used to decrease the apparent viscosity of the hydrocarbons in the subterranean formation. For example, steam, at elevated temperature, is frequently injected to liquify heavy crudes (those having an API gravity value less than 20°.) Other hydrocarbon products may not be under enough pressure in situ to force the hydrocarbons through the subterranean formation. Pressure can be insufficient either because the subterranean formation is not under much pressure naturally or, in the later stages of production, because the subterranean formation has lost pressure due to loss of a significant volume of hydrocarbons. Gas injection can be used to apply artificial pressure to force the hydrocarbon product through the subterranean formation.

An injected gas, for example, steam, is frequently augmented with a foaming agent. For example, it has been observed that steam tends to find channels of less resistance in the rock and by-pass hydrocarbons in the subterranean formation on its way to the production well. Since the function of the injected steam is to change the physical state of the hydrocarbon by heat transfer, techniques that allow the steam to remain in prolonged contact with the hydrocarbon product have been developed. One of these techniques is the addition of a foaming agent to the steam, which increases the apparent viscosity of the steam as it passes through the subterranean formation. Addition of the foaming agent slows the passage of the steam through the subterranean formation and increases contact with, and therefore heat transfer to, the hydrocarbons in the subterranean formation.

Gas injection without a foaming agent has also been used to increase the recovery of natural gas and gas condensate (natural gas that is liquid under the conditions of the subterranean formation.) In this application a gas that will not liquify under the conditions of the well, hereinafter a non-condensable gas, is injected into the subterranean formation containing the gas condensate. The injected gas maintains the pressure of the hydrocarbon product in the later stages of production. However, gas injection presents problems of maintaining continuous contact between the hydrocarbon product and the injected gas. Due to the relatively low viscosity of the injected gas and inhomogeneities in the subterranean formation, the injected gas will "finger" or flow through the paths of least resistance. Therefore, significant portions of the subterranean formation are bypassed, and the recovery well is subject to early break through of the injected gas. Moreover, due to the relatively lower density of the injected gas, it will frequently rise to the top of the subterranean formation and override the portions of the subterranean formation bearing the hydrocarbon product. In other words, the driving gas will bypass the product bearing portions of the subterranean formation either by channelling through portions of the subterranean formation already depleted of product, or the light driving gas will stratify in the formation and rise above the product. The result of either event is that the product is not pushed, and the producing well yields little of the desired driven product gas and instead produces only large quantities of the injected driving gas. All of these factors may result in lowered hydrocarbon recovery.

Injected foam increases the apparent viscosity of an injected gas and improves the efficiency of a gas flooding process. However, although foam has been used in conjunction with a driving gas in wells producing heavier product, it has not been used with natural gas or gas condensate. The reason is that in the case of natural gas ($C_1$ to $C_{12}$) being driven by a light driving gas such as methane, the driving gas and the driven gas are more nearly the same density than in the case of driving a very heavy crude oil with steam. Therefore, it has been believed that foam could not act as an effective barrier because the foam would not maintain its structure as the driving gas and the driven gas crossed the foam barrier.

SUMMARY OF THE INVENTION

It has now been discovered that gas condensate hydrocarbon products can be recovered by injecting a mixture of (1) a non-condensable immiscible driving gas and (2) a foaming agent comprising water and a suitable surfactant into a subterranean formation containing unrecovered light hydrocarbon products. It is particularly suitable to use this technique to drive gas condensate. The driving gas can have nearly the same density as the hydrocarbon product. The foam barrier maintains its structure, increasing the apparent viscosity of the driving gas and forcing it into intimate contact with the gas condensate. Preferred foaming agents form a foam that breaks upon contact with the gas condensate product, thereby lowering the apparent viscosity of the driving gas in the region of the hydrocarbon product. This results in greater driving force to the hydrocarbon product.

In a gas condensate field, already subject to gas injection, having a plurality of injection wells and recovery wells, a mixture of foaming agent and water is injected into the injection wells with the injected gas. The foam produced down hole forms a high apparent viscosity barrier that forces the injected driving gas into the product bearing portions of the subterranean formation, instead of the paths of less resistance where the product has already been removed. When the foam contacts the gas condensate, it breaks, allowing the apparent viscosity of the driving gas to decrease and providing greater push to the product. The result is increased yield of light hydrocarbon product at the recovery wells.

DETAILED DESCRIPTION

Light hydrocarbon recovery is enhanced by injecting a non-condensable light gas that is immiscible with the hydrocarbon product, and a foaming agent, comprising water and a suitable surfactant, into the subterranean formation containing the hydrocarbon product. The foam forms a semi-permeable barrier in the sense that some of both the injected driving gas and the light hydrocarbon product gas may cross the barrier in the subterranean formation. However, it has been found that the semi-permeable barrier formed by the foam maintains its structure in the subterranean formation. The semi-permeable barrier drives the light hydrocarbon gas to the recovery well in the subterranean formation where the light hydrocarbon product is recovered. It is preferred that the recovery well be separate and some distance from the injection well, although the recovery well can be a second perforated part of the injection well. The particular surfactant used in the foaming agent is dependent on the subterranean formation and the conditions down hole.

The light hydrocarbon product can be gas condensate or natural gas. As defined herein, the light hydrocarbon product has a density value of 50° API or greater, preferably it has a density value greater than 55° API. Such a product usually contains light hydrocarbons that are gaseous at 20° C. at one atmosphere pressure. The heaviest components of such a product normally comprise fewer than twelve carbon atoms, and frequently fewer than eight carbon atoms. The mean size for these components is preferably fewer than six carbon atoms. Such a product is frequently present in the form of a condensed liquid, despite high down hole temperature, because of the extremely high pressure of the gas condensate in the subterranean formation.

The driving gas is a non-condensable gas under the conditions in the well. Usually this is the case because the driving gas is supercritical under the conditions of the well. Below critical conditions the gas chosen as the driving gas must, under the conditions of the well, be immiscible with the hydrocarbon product. If the conditions within the reservoir are such that the driving gas and the product gas are both supercritical then miscibility of the injected fluid and the product fluid
is inherent and does not influence the effectiveness of the foam. The process does not depend on the injected gas dissolving in the hydrocarbon product. Most preferred driving gases have an API gravity value of 75° or more. One such preferred driving gas is methane. In a subterranean formation, the methane in a gas condensate hydrocarbon product will already have come to a gas-liquid equilibrium with the liquid portion of hydrocarbon product Moreover, methane, having a critical temperature of $-82.3°$ C. and a critical pressure of 46.5 atmospheres (674 psia), is supercritical at the conditions that prevail in most wells. Consequently, methane is immiscible with the gas condensate hydrocarbon product. Another example of a suitable driving gas is nitrogen.

The surfactant chosen for inclusion in the foaming agent should foam under the pressure and temperature conditions that exist down hole in the subterranean formation. The surfactant must also produce a suitable rise of driving gas resistance through the hydrocarbon-containing subterranean formation. Candidate surfactants for foaming agents are screened by two tests, the foaming test and the resistance increase test, to see if they are likely to function properly in the conditions of the well. First, in the foaming test, a sample of the surfactant is subjected to down hole pressure and temperature conditions in a cell equipped with a view port, and then shaken to visually confirm that foam is produced at that pressure and temperature. Second, in the resistance increase test, the candidate surfactants that pass the first test are driven under pressure through a core sample obtained from the subterranean formation containing the hydrocarbon product. A foaming agent passes the second test if the passage of the surfactant significantly increases the resistance of a pressurized gas as it traverses the core. The increase in resistance is tested by measuring the pressure drop from the entrance to the plug to the exit from the plug. The best surfactant, other considerations, such as cost, aside, is the one that produces the greatest pressure drop. Practical surfactants are those that give the best results at the lowest cost. Typical surfactants used to recover heavy oil include various sulfonates, for example, linear toluene sulfonates, ethoxylated alcohol glyceryl sulfonates, and mixed alkyl sulfonates. Linear toluene sulfonates are preferred for this invention. However, any surfactant that passes the two tests listed above is suitable.

Preferably, the surfactant chosen forms a foam down hole that tends to be broken by contact with the light hydrocarbon product, although the foam must be stable in the presence of the driving gas. Then, when the foam contacts the light hydrocarbon product in the subterranean formation, the foam breaks up as the surfactant dissolves in the hydrocarbon product. The increased resistance contributed by the foam disappears, and the driving gas then more efficiently drives the light hydrocarbon product. Therefore, light hydrocarbon products that were difficult to drive by the gas alone tend to be preferentially driven by the combination of the foam and gas.

The foaming agent is pressurized on the surface and injected with water and the non-condensable gas. As the conditions reach optimum for foaming down hole, the mixture starts to foam. The foam enters the subterranean formation and is pushed by the pressurized gas behind. The injection gas-to-surfactant ratio is greater than 5 to 1, preferably it is between 5 and 20 to 1, and most preferably it is between 10 and 20 to 1. Typical foaming agent solutions contain less than 1 wt % surfactant solution, preferably less than about 0.10 wt % surfactant solution. When foam injection first starts in a particular subterranean formation, at least some surfactant may be adsorbed onto the subterranean formation rock. Therefore, more surfactant may be needed initially than when the well has been subject to foaming agent injection for some period of time.

The invention is further described by the following example which is illustrative of various aspects of the invention and is not intended as limiting the scope of the invention as defined by the appended claims.

EXAMPLE

In this example of the foaming test the foaming characteristics of candidate surfactants were found at the conditions known to exist down hole. In this example the conditions used were those found down hole at a gas condensate reservoir in Alabama, which has a temperature of about 325° F. and a pressure of about 5500 psia pressure. Each candidate surfactant was placed in a cell having a port for viewing, and the cell was shaken at the subterranean formation temperature of 325° F. and pressure of 5500 psia. The amount of foaming that occurred was visually assessed. The surfactants tested and the commercial source for each are shown in Table I.

TABLE I

| NAME | SOURCE | STRUCTURE |
| --- | --- | --- |
| CHASER SD-1020 | CHEVRON | MIXED $C_{20\ to\ 24}$ ALKYL ARYL TOLUENE SULFONATE |
| CHASER CD-1040 | CHEVRON | MIXED ALKYL SULFONATE |
| LTS-18 | SHELL | LINEAR $C_{16\ to\ 18}$ ALKYL TOLUENE SULFONATE |
| NEGS 25-12 | PILOT | $C_{12\ to\ 15}$ ALCOHOL ETHOXY GLYCERYL SULFONATE |
| NEGS 91-2.5 | PILOT | $C_{9\ to\ 11}$ ALCOHOL ETHOXY GLYCERYL SULFONATE |

LTS-18, NEGS 25-12, and NEGS 91-2.5 all showed favorable visual foaming characteristics under down hole pressure and temperature conditions. Each was then for resistance increase in a sample of core taken from the subterranean formation. The core sample was placed in a pressure chamber and subjected to the pressure (about 5500 psia) and temperature (about 325° F.) found down hole. LTS-18, NEGS 25-12, and NEGS 91-2.5 were tested by sending a plug of surfactant in water through the core. The pressure was measured at the entrance to the core plug and the exit from the core plug. The difference in pressure from the input side of the core to the exit side of the core was then measured. The results of these two tests for carbonate rock from the Alabama formation at approximately 5500 psia at a temperature of 325° F. showed that LTS-18 gave the best results under the conditions to be expected in the gas condensate producing subterranean formation.

Although this invention has been primarily described in conjunction with an example and by references to embodiments thereof, it is evident that many alternatives, modifications and variations will be apparent to those skilled in the art in light of the foregoing description. Accordingly, it is intended that the spirit and scope of the appended claims embrace all such alternatives, modifications and variations.

What is claimed is:

1. A method for improving recovery of gas condensate comprising:
   injecting a composition of matter comprising a mixture of (1) a non-condensable gas and (2) a foaming agent comprising a surfactant and water into a subterranean formation containing a gas condensate;
   pressurizing the gas condensate with the injected non-condensable gas and foaming agent; and
   recovering the gas condensate.

2. The method of claim 1 wherein the gas condensate comprises a hydrocarbon product having an API gravity value of greater than 50° API.

3. The method of claim 1 wherein the foaming agent foams at the temperature and pressure down hole.

4. The method of claim 3 wherein the temperature of the subterranean formation is greater than 300° F. and the pressure is greater than 4000 psia.

5. The method of claim 1 wherein the surfactant produces foam at formation pressure and temperature when shaken.

6. The method of claim 5 wherein a sample of the surfactant significantly increases the resistance of pressurized gas through a sample of formation core at formation pressure and temperature.

7. The method of claim 6 wherein the foaming agent comprises a linear toluene sulfonate as the surfactant.

8. The method of claim 7 further comprising driving the gas condensate through the subterranean formation to a recovery well.

9. The method of claim 1 wherein the injecting step comprises injecting a composition having a gas to foaming agent weight to weight ratio greater than 5 to 1.

10. The method of claim 9 wherein the surfactant produces foam at formation pressure and temperature when shaken.

11. The method of claim 10 wherein a sample of the surfactant significantly increases the resistance of pressurized gas through a sample of formation core at formation pressure and temperature.

12. The method of claim 11 wherein the foaming agent comprises a linear toluene sulfonate as the surfactant.

13. The method of claim 9 wherein the injection step comprises injecting a foaming agent containing less than 1 wt % surfactant.

14. The method of claim 13 wherein the injection step comprises injecting a foaming agent composition containing no more than 1 wt % of a linear toluene sulfonate in water.

15. The method of claim 14 wherein the injection step comprises injecting methane under supercritical conditions as the noncondensable gas.

16. The method of claim 1 wherein the injection step comprises injecting methane under supercritical conditions as the noncondensable gas.

17. The method of claim 1 wherein the gas condensate is recovered in a recovery well.

18. The method of claim 17 wherein the recovery well is separate from the injection well.

19. The method of claim 18 further comprising driving the gas condensate through the subterranean formation to the recovery well.

20. The method of claim 19 wherein the injection step comprises injecting a composition having a gas to foaming agent weight to weight ratio greater than 5 to 1.

21. The method of claim 20 wherein the surfactant produces foam at formation pressure and temperature when shaken.

22. The method of claim 21 wherein a sample of the surfactant significantly increases the resistance of pressurized gas through a sample of formation core at formation pressure and temperature.

23. The method of claim 22 wherein the foaming agent comprises a linear toluene sulfonate as the surfactant.

24. The method of claim 1 further comprising creating a barrier in the subterranean formation produced by an injected non-condensable gas under supercritical conditions and the foaming agent, and driving the gas condensate through the subterranean formation to a recovery well.

25. A method for creating a semi-permeable gas driving barrier for driving gas condensate through a subterranean formation to a recovery well comprising:
   injecting a barrier composition, comprising (1) a non-condensable gas at subterranean formation pressure and temperature, said gas having an API gravity value greater than 75°, and (2) a foaming agent, comprising water and a surfactant, down a gas condensate well;
   forcing the barrier composition out of the well into the subterranean formation, at a pressure and temperature sufficient to cause foaming of the barrier composition, said subterranean formation containing a gas condensate product; and driving at least some of the gas condensate produce through the formation.

26. The method of claim 25 wherein the gas condensate product has an API gravity value of no less than 55°.

27. The method of claim 26 wherein said noncondensable gas comprises a gas substantially immiscible with said gas condensate.

28. The method of claim 27 wherein the barrier composition comprises a composition having a gas to foaming agent weight to weigh ratio greater than 5 to 1.

29. The method of claim 28 wherein the foaming agent comprises a composition containing less than 1 wt % surfactant.

30. The method of claim 29 wherein the foaming agent comprises no more than 1 wt % of a linear toluene sulfonate in water.

31. The method of claim 30 wherein the linear toluene sulfonate containing foaming agent foams in a subterranean formation having a temperature greater than 300° F. and a pressure greater than 4000 psia.

32. The method of claim 26 wherein said noncondensable gas and said gas condensate product are both at supercritical conditions.

33. The method of claim 25 wherein the non-condensable gas comprises methane.

* * * * *

UNITED STATES PATENT AND TRADEMARK OFFICE
CERTIFICATE OF CORRECTION

PATENT NO. : 5,178,217

DATED : January 12, 1993

INVENTOR(S) : Shane S. Mohammadi and John D. Collins

It is certified that error appears in the above-identified patent and that said Letters Patent is hereby corrected as shown below:

Claim 9, column 6, line 4, replace "injecting" with -- injection --.

Claim 25, column 7, line 3, replace "produce" with -- product --.

Signed and Sealed this

Third Day of May, 1994

Attest:

BRUCE LEHMAN

Attesting Officer     Commissioner of Patents and Trademarks